United States Patent [19]

Tsuruta

[11] 4,079,846

[45] Mar. 21, 1978

[54] APPARATUS AND METHOD FOR TAKING OUT A SINGLE SHEET FROM A STACK OF VENEER SHEETS

[75] Inventor: Kouki Tsuruta, Toyoake, Japan

[73] Assignee: Meinan Machinery Works, Inc., Ohbu, Japan

[21] Appl. No.: 723,964

[22] Filed: Sep. 16, 1976

[30] Foreign Application Priority Data

Sep. 19, 1975 Japan .................................. 50-113953

[51] Int. Cl.² .............................................. B66C 1/58
[52] U.S. Cl. ............................ 214/8.5 B; 214/8.5 R; 214/8.5 A; 214/152; 294/61
[58] Field of Search ............. 214/8.5 C, 8.5 R, 8.5 A, 214/152, 8.5 B; 294/61, 67 BC

[56] References Cited

U.S. PATENT DOCUMENTS

| 1,957,719 | 5/1934 | Naugle | 294/61 |
| 2,675,261 | 4/1954 | Egge | 294/67 BC |

FOREIGN PATENT DOCUMENTS 2,313,598  9/1974  Germany .......................... 214/8.5 C Primary Examiner—Trygve M. Blix
Assistant Examiner—George F. Abraham
Attorney, Agent, or Firm—Armstrong, Nikaido & Marmelstein

[57] ABSTRACT

A method of taking out one after another veneer sheet from stacks of these which comprises steps of: disposing a picking-up means with a pointed element with its pointed end at an opposite position to a butt end of the uppermost veneer sheet to be delivered; horizontally moving the picking-up means so that its pointed end is thrust into the veneer sheet at the butt end; lifting the picking-up means with the veneer sheet at the butt end, with a distance to separate the veneer sheet from the two adjoining veneer sheets on either side; and further, horizontally moving the picking-up means with the veneer sheet, whereby only the uppermost veneer sheet can be shifted in the direction towards delivery position.

11 Claims, 8 Drawing Figures and APPARATUS AND METHOD FOR TAKING OUT A SINGLE SHEET FROM A STACK OF VENEER SHEETS

DETAILED DESCRIPTION OF THE INVENTION

The present invention relates to a method for taking out one after another veneer sheets from stacks of these in the course of plywood production.

Heretofore, various methods of taking out veneer sheets and equipment therefor have been proposed. For example, such methods are well-known in which a sheet of veneer is taken out after being lifted up by thrusting pins into the surface thereof, or by attracting it with a suction fan. However, in these conventional methods, since pins or attracting members act on the surface of the veneer, if fractional veneers (divisional veneers having a fractional size smaller than that of the plywood to be produced) are stacked without being joined together sideways as shown in FIG. 1, a disturbance or a cleavage occurs, rendering said thrusting or attraction difficult, and the one-by-one separation of veneers impossible. Further, the operation of said methods is quite unstable in that raw veneers sticks together due to moisture contained therein, resulting in an unreliable separation of layers of veneer in which, often, more than one sheet is taken out, or not a layer is taken out.

A method also is known in which, as shown in FIG. 2, the veneer sheets are stacked with their butt ends in shifted positions, one after another, so that they alternately protrude and withdraw by a predetermined length. The shifted portion of the veneer sheet $1_b$ from the veneer sheet $1_a$ above it is pressed down, and air is blown in between said layers $1_a$ and $1_b$, thereby floating said layer $1_a$ from $1_b$ to thus take out the floating sheet in the direction of its fibers. However, since an equal force cannot be exerted onto all of the fractional sheets of veneer when pressing the same, and since it is difficult to cause the air to act uniformly on all the sheets because said fractional veneer sheets have different sizes, it is impossible to push out the sheets smoothly.

As described hereinbefore, all of the conventional methods have their respective disadvantages and from a practical point of view, do not work efficiently.

Accordingly, an object of the present invention is to overcome the aforementioned disadvantages associated with the conventional methods by providing a novel and improved method of taking out veneer sheets, one by one, from a stack thereof in order that the sheets may be fed continuously and accurately to a different device, e.g. a drying machine.

Another object of the present invention is to provide a method of taking out veneer sheets one by one, even when fractional veneers causing a disturbance or a cleavage are handled.

Still another object of the present invention is to provide a method of taking our veneer sheets one by one even if said sheets are not completely dry and stick together due to the moisture contained therein.

A further object of the present invention is to provide a method of taking out veneer sheets one by one, even if the upper surfaces thereof have irregularities and/or undulations.

These and other objects features and advantages will be apparent to those skilled in the art from the following detailed description and the appended claims.

Essentially, according to the present invention, there is provided a method for taking out sheets of veneer from stacks of these, one after another, comprising the steps of: disposing a pointed element with its pointed end at an opposite position to one butt end of the uppermost veneer sheet to be delivered; horizontally moving the pointed element so that its pointed end is thrust into the veneer sheet at the butt end; lifting the pointed element with the veneer sheet at the butt end, with a distance to separate the butt end from two adjoining veneer sheets on either side; and further, horizontally moving; the pointed element with the veneer sheet to shift it towards delivery position.

This invention will now be more particularly described with reference to the accompanying drawings showing preferred embodiments thereof in which.

Figure 3:
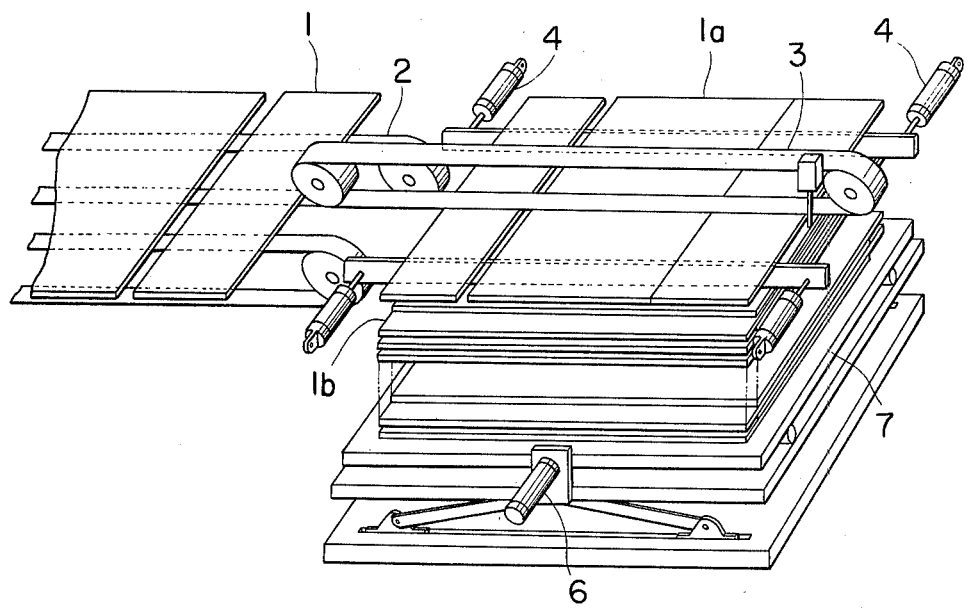
FIG. 3 is an oblique view of a device for stacking veneer sheets in the manner as shown in FIG. 2.
Figure 4:
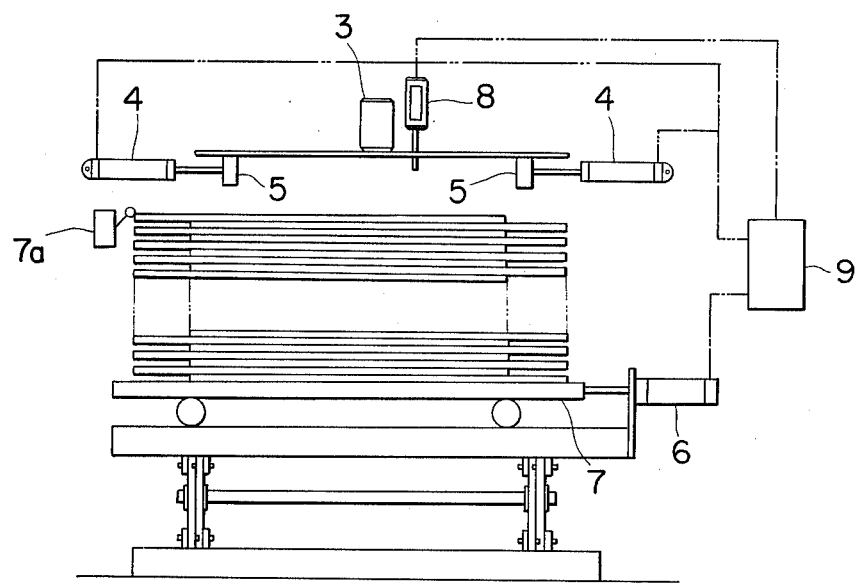
FIG. 4 is a side view of the device shown in FIG. 3.

Referring now to FIGS. 3 and 4, first, veneers sheets, cut to a predetermined size are carried in a direction perpendicular to the fibers thereof by a conveyor 2 to be fed to the space between a belt 3 and supporting rods 5. Said belt 3 moves synchronously with said conveyor 2 and in contact with the upper surface of said veneer 1. The supporting rods 5 which supports said veneer 1 from the underside thereof and on the opposite side of said belt 3, are adapted to alternately be opened from and closed to each other by cylinders 4. Below said belt 3 and supporting rods 5, a stacking stand 7 for stacking, the veneer sheets 1 is provided so that said stand 7 can be elevated and lowered by a suitable means known in the art. The stacking stand 7, receives an additional veneer sheet every time is moved by a cylinder 6 in a predetermined distance (*l*) alternately in one direction or its opposite direction thereto which is parallel with the direction of the fibers of the veneer sheets 1. 8 Is a sensing element which sends a signal to the cylinders 4 to open the supporting rods 5 every time the leading edge in the direction of the movement thereof, to reach a position of the veneer sheets 1 move ahead of said belt 3 where said veneer sheets 1 are to be dropped. Also, said sensing element 8 generates a signal for activating a timer (not shown) which causes said cylinders 4 to bring the supporting rods 5 back to their original position, after a predetermined time interval from the distancing thereof. A controlling device 9 controls the operation of the cylinders 4 and 6 and of the sensing element 8.

Hereafter, the operation of the aforementioned device according to the invention will be described in detail. The belt 3 acts on the veneer sheet 1, carried in by said conveyor 2 in a direction perpendicular to the fiber thereof from the upside thereof, while said veneer sheet is slideably moved on said supporting rods 5 to a stacking position, where said cylinders 4 are activated by the signal fed from said sensing element 8 to distance said supporting rods 5, thereby causing the veneer sheet 1 carried thereon to drop onto said stacking stand 7. After a predetermined interval, the timer generates a signal which is sent to said cylinders 4 which causes said supporting rods 5 to return to the initial positions thereof and, at the same time, a signal is sent by said timer to another cylinder 6 so as to cause the latter to move the stand 7 by said predetermined distance ($l$) in the direction of the fibers of said veneer sheet 1. Said stacking stand 7 changes the direction of its movement every time said veneer sheet 1 drops thereon so as to stack the veneer sheets with their butt ends disposed in a shifted position by the predetermined distance ($l$), as shown in FIG. 4.

Figure 1:
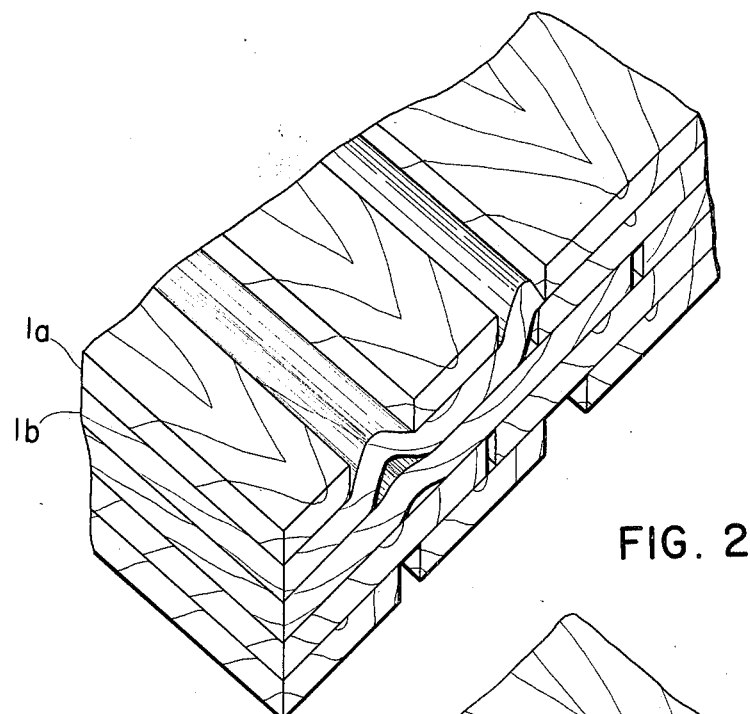
FIG. 1 is a partial oblique view of a stack of fractional veneers with butt ends thereof being disposed in the same plane.
Figure 2:
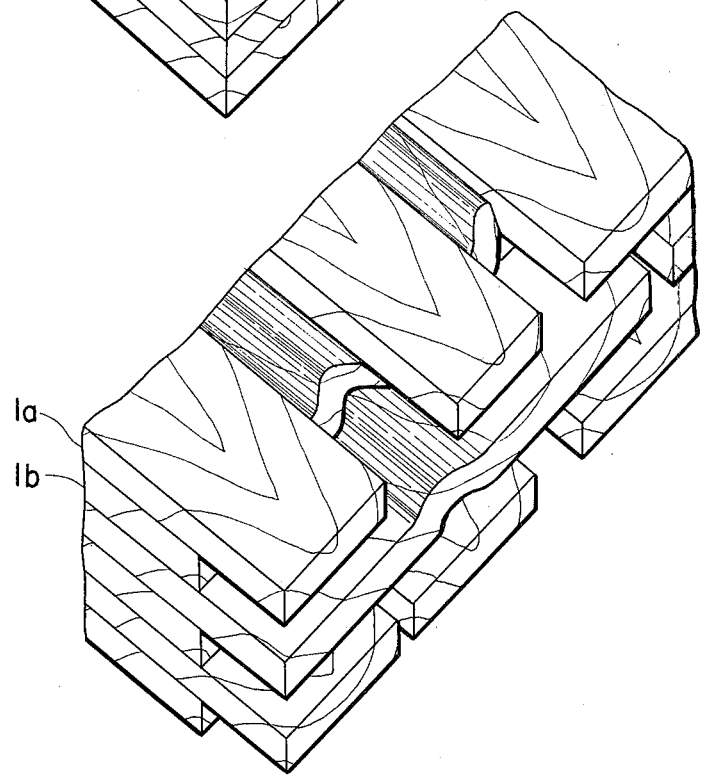
FIG. 2 is a partial oblique view of a stack of fractional veneers in which the veneer sheets are stacked in a layered position one after another.

As described above, said veneer sheets are stacked in a state in which the butt ends thereof alternately protrude and withdraw, as shown in FIG. 2. However, it goes without saying that such a stack of veneer sheets may be achieved manually.

Figure 5:
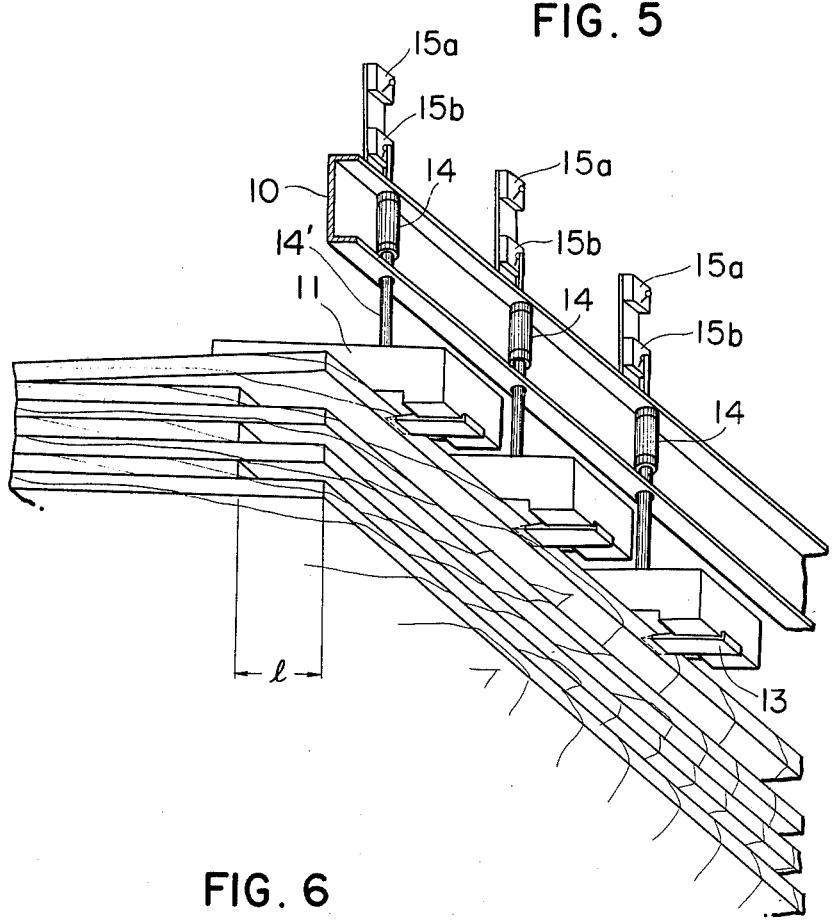
FIG. 5 is an oblique view showing a preferred embodiment of a device for taking out veneer sheets according to the method of the present invention.
Figure 6:
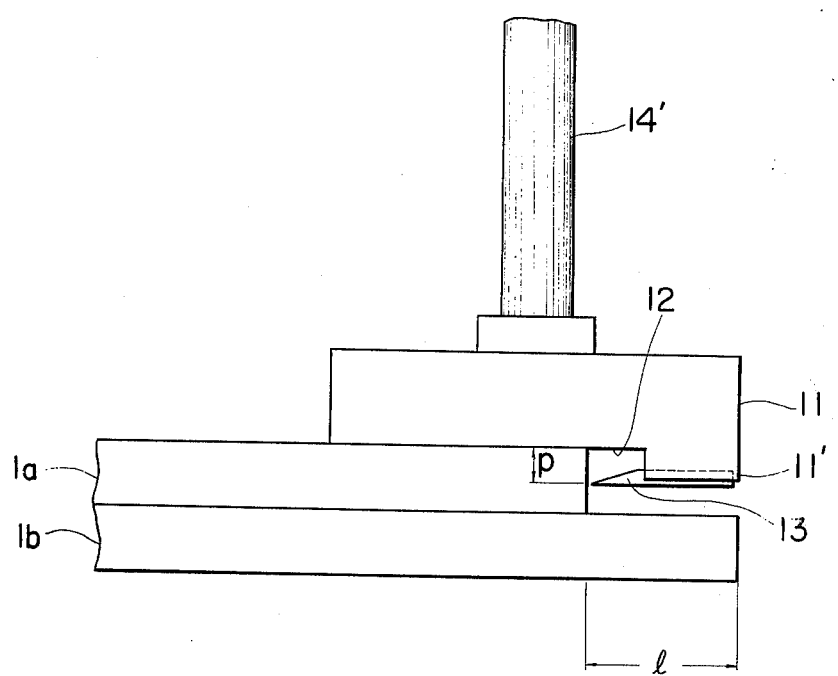
FIG. 6 is an enlarged partial side view of the device shown in FIG. 5.
Figure 7:
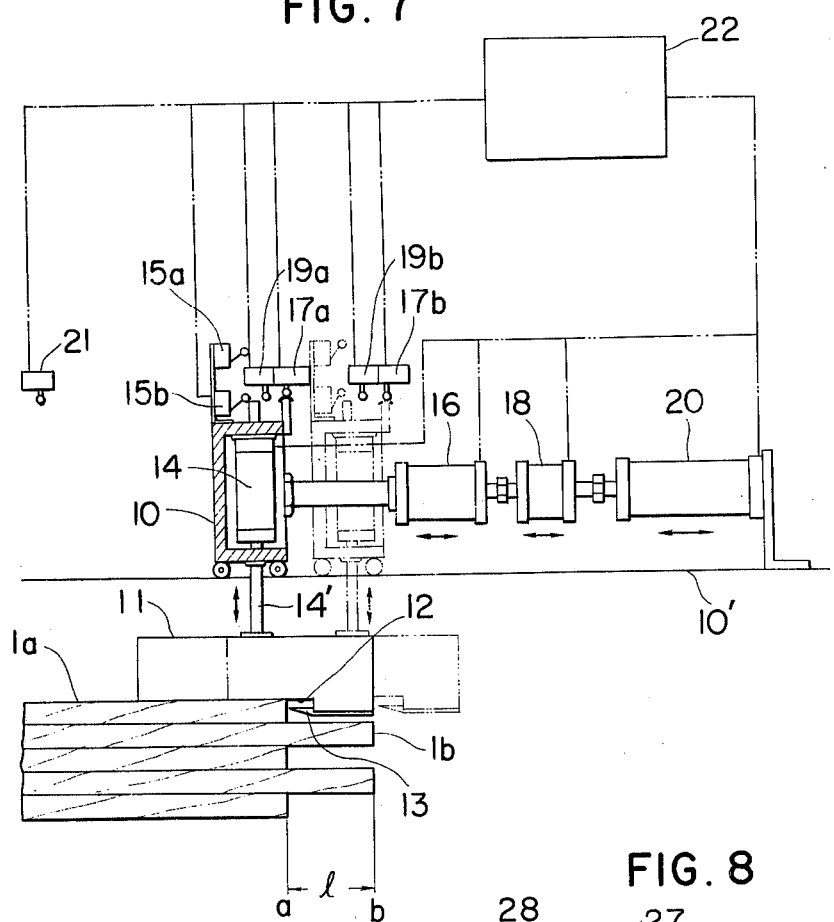
FIG. 7 is a schematic diagram illustrating the operation of and the control of the device shown in FIG. 5.

Next, a device for taking out veneer sheets one by one from the stack thereof, formed as described above to feed the same to other device will be described in detail with reference to FIGS. 5 and 7. Above the stacked veneer sheets 1, a carrier member 10 having a frame-like shape and movable on horizontal guide rails 10' is provided across the entire width of said veneer sheet 1. Said carrier member 10 is provided with a plurality of vertical cylinders 14 having a rod 14' vertically movable and acting as a support member of a picking-up means and by a suitable interval. At the lower end of the rod 14' of the respective cylinders 14, there is provided a picking-up means 11. As clearly shown in FIG. 6, said picking-up means 11 is provided with a pointed element 13 having a pointed end such as a knife or a needle at a predetermined distance (P) less than the thickness of the veneer sheet 1 from the underside of the picking-up means 11 (preferably a distance equal to a half of the thickness of the veneer). The pointed element may be fixed to the base mound at its projecting part 11' extending from the base mound as shown in the drawing. The pointed end of said element 13 is directed to the butt end of the veneer sheet 1. As understood from the aforementioned description, the underside of the picking-up means 11 constitutes a reference surface 12 which abuts on the upper surface of said veneer sheet 1 to set it on the butt end of the veneer sheet 1 at a position into which the pointed element 13 is thrust. In FIG. 7, numeral 16 designates a cylinder having a rod thereof coupled to the carrier member 10 so as to cause the carrier member 10 to reciprocate by the predetermined length (1), thereby setting the carrier member 10 to the position ($a$) of the butt end of the uppermost veneer sheet ($1_a$) and the position ($b$) of the veneer sheet ($1_b$) beneath the uppermost veneer sheet ($1_a$), respectively. The positioning of the carrier member 10 to said positions ($a$) and ($b$) is effected by the carrier member position sensing elements ($17_a$) and ($17_b$) provided above the space in which said carrier member 10 moves. The sensing elements ($17_a$) and ($17_b$) are arranged so that when contacted by a portion of said carrier member 10, the carrier member sensing elements ($17_a$) and ($17_b$) are activated and send a stop signal to the cylinder 16. Simultaneously therewith, the respective cylinders 14 are activated as a result of the activation of the sensing elements ($17_a$) and ($17_b$) to lower said picking-up means 11. At the upper portion of the carrier member 10, there is provided for the picking-up means upper limit position sensing elements ($15_a$) and ($15_b$) on which the rod extending upward from the cylinder 14 abuts when the picking-up means 11 is in its lifted position. A lower limit position can be detected by a sensing elements ($15_b$). Upon completion of the lowering of the picking-up means 11, the rod activates the lower limit position sensing element ($15_b$) which sends a stop signal to the cylinder 14. Also, an activating signal is supplied to a thrusting cylinder 18 from a timer after a predetermined time interval. The thrusting cylinder 18 has a rod thereof coupled to a rod extending behind the cylinder 16. The thrusting cylinder 18 is activated by the activating signal sent by the sensing element ($15_b$) and moves the picking-up means 11 slightly to the left via the cylinder 16 and; the carrier member 10 to thrust the pointed element 13 into the butt end of the veneer sheet ($1_a$). Adjacent the lefthand side of the sensing elements ($17_a$) and ($17_b$), there are provided thrusting sensing elements ($19_a$) and ($19_b$), a respectively. Therefore, when a portion of the carrier member 10 makes contact with the sensing elements ($19_a$) and ($19_b$) in the course of said movement, the sensing elements send a stop signal to the thrusting cylinder 18 and simultaneously activate the cylinder 14 to lift the picking-up means 11. When the picking-up means is lifted to predetermined distance, the uppermost position sensing element ($15_a$) which is activated by the rod of said cylinder 14 gives an activating signal to a "take out" cylinder 20. The "take out" cylinder 20 has one end thereof fixed to the frame, and the rod thereof coupled to a rod extending backward of the thrusting cylinder 18. Upon receiving the activating signal from said sensing element ($15_a$), the "take out" cylinder 20 is activated to move the lifted picking-up means 11 to the left, as shown in FIG. 7 through cylinders 18 and 16. Ahead of the carrier member 10 and in the direction of the movement thereof, there is provided another sensing element 21 which sends a stop signal to the "take out" cylinder 20 when contacted by a portion of said carrier member 10. Aforementioned cylinders 14, 16, 18 and 20 are activated by pneumatic or hydraulic power, respectively. In FIG. 7, numeral 22 indicates a controlling device. Limit switches or proximity type switches may be used as sensing elements 15, 17, 19 and 21.

Hereafter, the operation of the "take out" device set forth hereinbefore will be described in detail.

Initially, the carrier member 10 is located in the position indicated by a dotted line in FIG. 7, and the picking-up means 11 is at its lifted position where the upper limit position ($15_a$) is depressed by the rod of the lifting cylinder 14. First, a case in which the veneer sheet $1_a$ is to be taken out will be discussed. If the carrier member 10 is moved to the left as shown in FIG. 7 by activating the cylinder 16, a portion of the carrier member 10 contacts the sensing element ($17_a$) to stop the cylinder 16. At the same time, the signal generated by the sensing element ($17_a$) activates the cylinder 14 to lower the picking-up means 11 so that the reference surface 12 abuts to the upper surface of the veneer sheet ($1_a$) to set the thrusting position for the pointed element 13. Thereupon, the circuit including the lower limit position sensing element ($15_b$) is opened and a signal is sent to activate the timer. After a predetermined time interval therefrom, the thrusting cylinder 18 is activated by the timer to move the carrier member 10 with the reference surface 12 thereof abutting to the upper surface of the veneer sheet ($1_a$) to the left and to thrust the pointed element 13 into the butt end of the veneer sheet ($1_a$). When the carrier member 10 is moved to a predetermined distance (thrusting distance), a portion of the carrier member 10 contacts the sensing element ($19_a$) to stop the thrusting cylinder 18. At this time, the pointed element 13 is completely thrust into the butt end of the veneer sheet ($1_a$). The sensing element ($19_a$) also sends a signal to the vertical cylinder 14 to lift the picking-up means 11 upward until the upper limits of the position sensing element ($15_a$) starts to activate. As described above, since the pointed element 13 is thrust into the butt end of the veneer sheet ($1_a$), the end portion of said veneer sheet ($1_a$) is also lifted in accordance with the upward motion of the picking-up means 11. When the end portion of the veneer sheet ($1_a$) has been lifted to the predetermined distance, the cylinder 14 is stopped by a signal sent by the upper limit position sensing element ($15_a$). Simultaneously therewith, said sensing element $15_a$ also applies a signal to the "take out" cylinder 20 to push and move the carrier member 10 to the left so that the veneer sheet ($1_a$) having the end thereof lifted can be taken out. When the carrier member 10 has reached the sensing element 21, the latter element sends signals to the cylinder 20 for the stopping and subsequent return movement thereof. Simultaneously, signals for the return movement are also sent to all other cylinders so as to return the same to their initial positions, respectively.

To take out the veneer sheet ($1_b$), the picking-up means is lowered without the activation of the cylinder 16 and, then, the pointed element 13 is thrust into the butt end of the veneer sheet ($1_b$) by the action of the cylinder 18. Thereafter, the cylinder 14 lifts the veneer sheet ($1_b$) together with the picking-up means 11 and, finally, the veneer sheet ($1_b$) is moved to the left and taken out by the action of the cylinder 20. In this case, the cylinder 16 may be extended to take out the veneer sheet ($1_b$) from the lefthand side of the device in combination with the action of said cylinder 20.

Further, it is arranged so that every time a veneer sheet is taken out, the stacking stand 7 is lifted by a distance equal to the thickness of the veneer sheet, as shown in FIG. 3, in order to maintain the uppermost veneer sheet at a constant level.

It is noted that if the veneer sheets have a sufficient stiffness which can stand against their own weight and can be delivered accordingly, they may be stacked in a manner in which the third veneer sheet from the top of the stack is shifted in the same direction as the second veneer sheet, with its butt end further protruded beyond the butt end of the second veneer sheet by a predetermined length.

As fully stated hereinbefore, according to the method of the present invention, when veneer sheets are stacked by shifting alternately by a predetermined distance (1), the position where the pointed element 13 is thrust into the butt end of the uppermost veneer sheet ($1_a$) is spaced apart in a direction of fiber by the predtermined distance (1) from the butt end of the immediately succeeding veneer sheet ($1_b$), thus preventing the pointed element 13 from being thrust into the butt end of the veneer sheet ($1_b$) simultaneously with the veneer sheet ($1_a$). Also, as shown in FIG. 2, even in the case of fractional veneer sheet without being joined sidewise together wherein portions of the succeeding layer of veneer sheet may be often protruded or raised from spaces between veneer sheets disposed in the upper most layer, the method according to the present invention permits element 13 thrust only into the butt end of the uppermost veneer sheet ($1_a$) without thrusting into the butt end of the succeeding veneer sheet. For example, as shown in FIG. 4, a sensing element ($7_a$) is provided to control the height of the stacking stand 7 so as to maintain the surface of the uppermost veneer sheet ($1_a$) within the range of level within which the cylinder 14 permits to make the reference surface of picking-up means in contact with the surface of uppermost veneer sheet.

Figure 8:
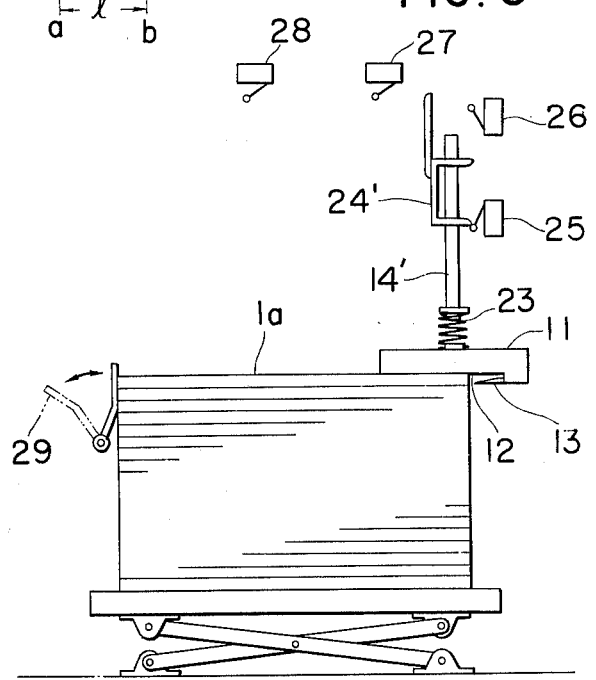
FIG. 8 is a schematic side view showing another preferred embodiment of a device for taking out veneers according to the method of the present invention.

FIG. 8 shows another embodiment of the present invention. On the stacking stand 7, veneer sheets 1 are stacked with the butt ends thereof disposed in the same plane, and a carrier member 24' is provided above the stacked veneer sheets 1. The picking-up means 11 is mounted to said carrier member 24' through a spring means 23 of the support member 14'. The spring 23 may be of any suitable type comprising an elastic member such as air tube. Numerals 25, 26, 27 and 28 indicate sensing members, respectively, for controlling the vertical and lateral movements of the picking-up means 11. In this embodiment of the taking-out device having an arrangement as described above, the carrier member 24' is lowered first, and the picking-up means is also lowered therewith. When the reference surface 12 of the picking-up means 11 elastically depresses the upper surface of the veneer sheet ($1_a$) through the spring means 23, of the support member 14', the lowering of the carrier member 24' is stopped by the activation of the sensing member 25. Then, if the carrier member 24' is moved to the left, pointed elements mounted on the projection part of the underside of the picking-up means 11 and spaced apart by a predetermined distance from the reference surface of the picking-up means thrusts into the butt ends of the veneer sheets ($1_a$), respectively, and the carrier member 24' is stopped by the activation of the sensing member 27. Thereafter, when the carrier member 24' is lifted to the level of the sensing member 26, the end portion of the veneer sheet ($1_a$) having the butt end thereof thrust by said pointed element 13 is also lifted together with the picking-up means 11 to separate from the succeeding veneer sheet. Then, the carrier member 24' is moved to the position of the sensing member 28 which causes the veneer sheet ($1_a$) to be taken out. Numeral 29 is a stopper for preventing the veneer sheet ($1_a$) from being shifted when the pointed element is thrusting into the butt end of said veneer sheet ($1_a$). The stopper is adapted so as to be displaced to a position indicated by the dotted line in FIG. 8 when taking out the veneer sheet ($1_a$). The stopper 29 may be advantageously used where a relatively smaller coefficient of friction exists between stacked veneer sheet such as dried veneers, but does not constitute an essential part of the present invention. In this embodiment, since the picking-up means 11 is mounted to the carrier member 24' through the spring means 23 of the support member 14', the reference surface 12 can make a close contact onto the upper surface of the veneer sheet ($1_a$), even if the upper surface of the veneer sheet has an irregularity or undulation and, therefore, the pointed element 13 can positively thrust into the butt end of the veneer sheet ($1_a$) in place.

As described fully hereinbefore, according to the method of the present invention, since the pointed element (13) can be thrust into a predetermined position on the butt end of the veneer sheet in place regardless of the shape or state of the veneer sheet to be handled, the veneer sheet can be lifted and separated one by one and to be taken out without fail.

Further, by lifting the end of the veneer having the butt end thereof thrust by the pointed element (13), the method according to the present invention permits a positive separation of a veneer sheet from the next succeeding layer of veneer sheet even when handling raw and wet veneer sheets the separation of which has been difficult by the conventional methods in the prior art.

In order to take out the veneer sheet to the position in a long distance, the known means such as suction fan can be used in addition to the method of the present invention.

What is claimed is:

1. A method of taking out sheets of veneer from a stack of sheets of veneer, said stack of sheets of veneer being arranged such that a butt end of each layer of said sheets is positioned a predetermined stepped distance with respect to a butt end of the next successive layer in a direction parallel to the direction of fiber of the veneer sheets; the method comprising the successive steps of disposing a plurality of picking-up means above and opposite one of the butt ends of the topmost layer of said stack of veneer sheets, each of said picking-up means having a reference surface and a tapered element disposed in the direction of fiber of the veneer sheets, the pointed end of the tapered element being arranged below said reference surface; lowering said picking-up means to contact said reference surface with the upper surface of said topmost layer of veneer sheets to place the tapered element directly opposite said one of the butt ends thereof; moving the picking-up means toward said one of the butt ends of said topmost layer and parallel to the upper surface of said topmost layer to thrust the pointed ends of said tapered elements into the butt end of the topmost layer of veneer sheets; lifting the picking-up means to separate the butt end of the topmost layer of said stack of veneer sheets from the butt end of the adjacent layer; and moving the picking-up means and topmost layer of veneer sheets in a horizontal direction and toward the delivery position.

2. A method as claimed in claim 1 wherein the reference surface of each of said picking-up means simultaneously and resiliently contacts the upper surface of said topmost layer of veneer sheets to maintain the pointed end of each of said tapered means at a level at which it is accurately directed toward said one of the butt ends of said topmost layer.

3. An apparatus for taking out sheets of veneer from a vertical stack of sheets of veneer and comprising a plurality of picking-up means arranged parallel to each other in a horizontal direction, each picking-up means comprising a supporting member movable vertically and horizontally, and a picking-up member resiliently connected to the supporting member, the picking-up member having a lower surface adapted to act as a reference surface with respect to the upper surface of the uppermost sheet of veneer and a tapered element having a sharply pointed end and horizontally positioned below said lower surface of the picking-up member at a level at which the distance of the pointed end from the reference surface is less than the thickness of a sheet of said veneer; said plurality of picking-up means being arranged such that the tapered elements are parallel to each other in a horizontal direction and point in the same direction perpendicular to a line between the pointed ends and adapted to oppose a butt end of the uppermost sheet of veneer; and means suitable for supporting said picking-up means.

4. An apparatus as claimed in claim 3, in which each of the picking-up means has a projection downwardly extending from the lower and reference surface, the tapered element being mounted to the projection.

5. An apparatus as claimed in claim 4, in which the distance between the reference surface and the lower surface of said projection is less than the thickness of the veneer sheet.

6. An apparatus as claimed in claim 3, in which the picking-up means are adapted to be actuated simultaneously.

7. An apparatus for taking out sheets of veneer from a vertical stack of sheets of veneer, said stack of sheets of veneer being arranged such that a butt end of each layer of said sheets is positioned a predetermined stepped distance with respect to a butt end of the next successive layer in a direction parallel to the direction of fiber of the veneer sheets, said apparatus comprising a carrier member (10) having a frame-like shape and adapted to be moved in a horizontal direction; spaced apart vertical cylinders (14) connected to said carrier member along the length thereof; each of said cylinders comprising a rod (14') movable vertically; and picking-up means (11) connected to the lower ends of said rods; each of said picking-up means comprising a base having a lower surface (12) adapted to act as a reference surface with respect to the upper surface of the uppermost sheet of veneer, a projecting portion (11') extending downwardly from one end of said base, and a tapered element (13) extending horizontally from said projecting portion along the lower surface of said base and having a sharply pointed end spaced apart from said lower surface of the base a distance less than the thickness of a sheet of said veneer, said picking-up means being arranged such that the tapered elements are parallel to each other in a horizontal direction and point in the same direction perpendicular to a line between the pointed ends and adapted to oppose a butt end of the uppermost sheet of veneer.

8. An apparatus as claimed in claim 7, which further comprises means (16) coupled to said carrier (10) for moving said carrier in a horizontal direction.

9. An apparatus as claimed in claim 7, wherein the picking-up means (11) are resiliently connected to said cylinders (14).

10. An apparatus as claimed in claim 7, in which movement of said carrier (10) and said rods (14') are actuated by means of position sensing elements.

11. An apparatus as claimed in claim 7, in which said rods (14') are adapted to be actuated simultaneously.

* * * * *